United States Patent [19]

Noble

[11] 4,442,976
[45] Apr. 17, 1984

[54] SUPPORT STRUCTURE FOR LAND IRRIGATION SYSTEM

[75] Inventor: Allen T. Noble, Boise, Id.

[73] Assignee: Noble Linear Irrigation, Inc., Boise, Id.

[21] Appl. No.: 297,557

[22] Filed: Aug. 31, 1981

Related U.S. Application Data

[63] Continuation-in-part of Ser. No. 146,122, May 2, 1980, abandoned, which is a continuation-in-part of Ser. No. 80,060, Sep. 28, 1979, Pat. No. 4,274,584, which is a continuation-in-part of Ser. No. 887,792, Mar. 17, 1978, abandoned.

[51] Int. Cl.³ .............................................. B05B 3/18
[52] U.S. Cl. .................................. 239/183; 239/711; 239/721
[58] Field of Search ............... 239/178, 183, 184, 709, 239/711, 718, 721

[56] References Cited

U.S. PATENT DOCUMENTS

| | | | |
|---|---|---|---|
| 2,944,741 | 7/1960 | Fish | 239/184 |
| 3,729,016 | 4/1973 | Von Linslowe | 239/711 |
| 4,274,584 | 6/1981 | Noble | 239/183 |

FOREIGN PATENT DOCUMENTS

| | | | |
|---|---|---|---|
| 289124 | 12/1915 | Fed. Rep. of Germany | 239/184 |
| 2402916 | 7/1974 | Fed. Rep. of Germany | 239/183 |
| 2484776 | 12/1981 | France | 239/178 |

Primary Examiner—John J. Love
Assistant Examiner—Michael J. Forman
Attorney, Agent, or Firm—Arnold, White & Durkee

[57] ABSTRACT

A land irrigation system is illustrated in which an elongated sprinkler line continuously travels in a direction transverse to its length along the length dimension of a stationary water main and is continuously supplied with water from upstanding hydrants spaced along the length of the water main. A driven tractor moves along the water main at substantially the same rate as the sprinkler line and a plurality of elongated water carrying pipe connector devices each have one end portion connected to the sprinkler line and their other end portion movable into position for automatic connection to and disconnection from successive hydrants along the water main, to permit substantially continuous movement of the trctor along the water main and movement of the respective water carrying connector pipe devices into position for connection to the hydrants. An improved I-shaped track provides free roller movement of the end portion of the respective water carrying connector pipes which is connected to the sprinkler line.

7 Claims, 10 Drawing Figures

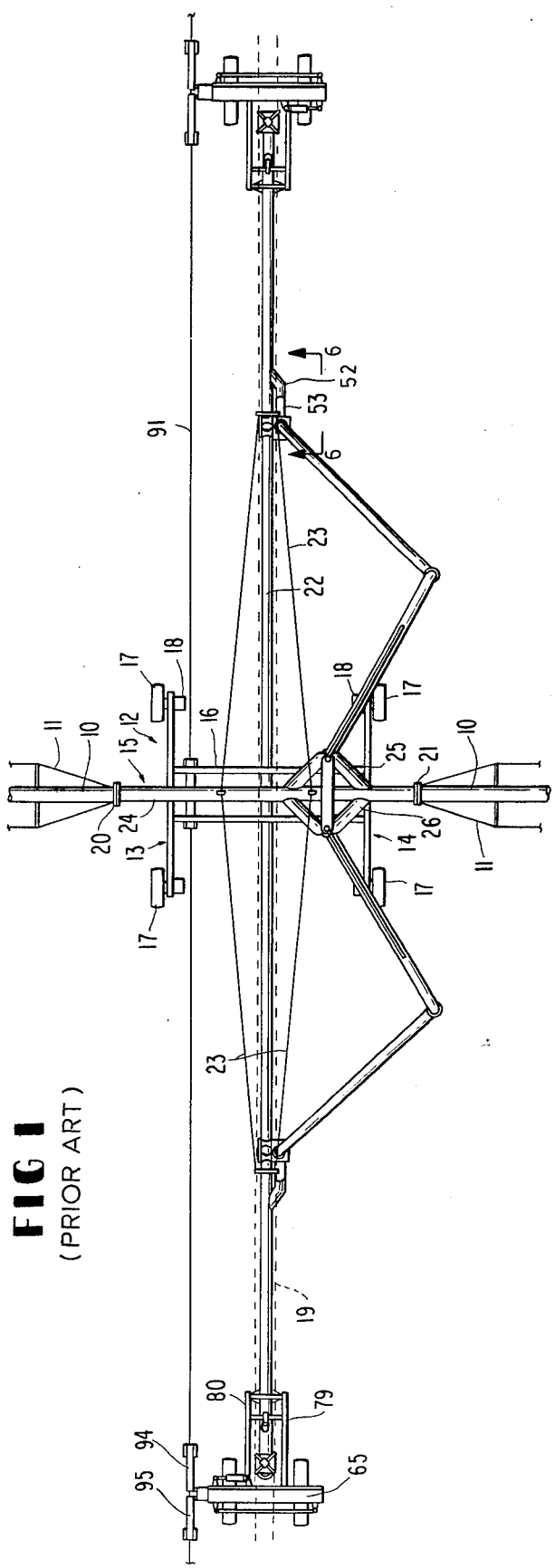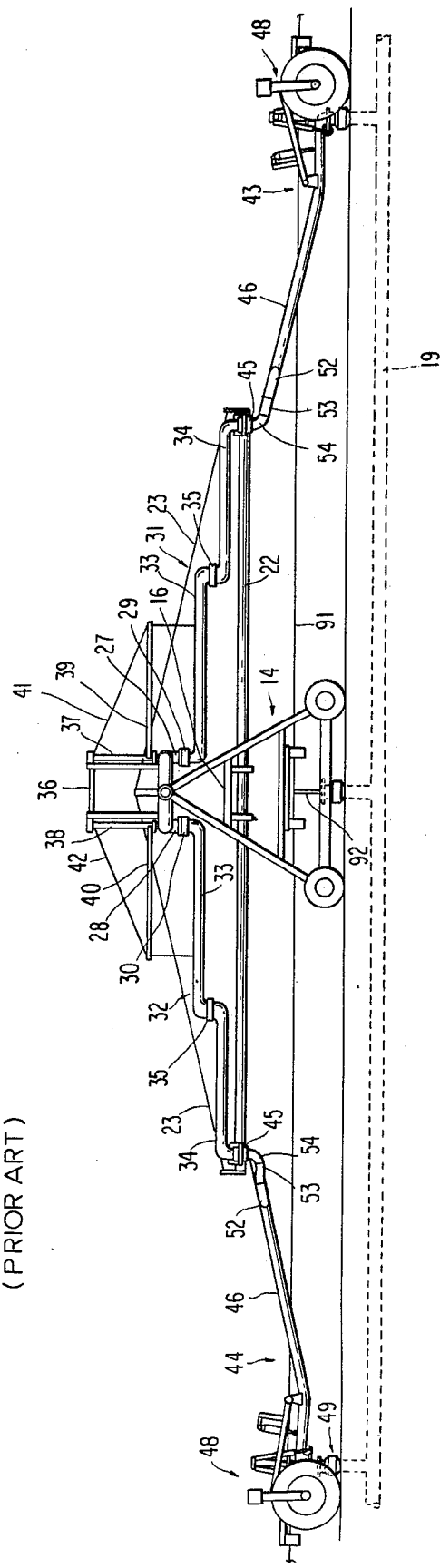
FIG 1 (PRIOR ART)
FIG 2 (PRIOR ART)

U.S. Patent   Apr. 17, 1984   Sheet 3 of 4   4,442,976
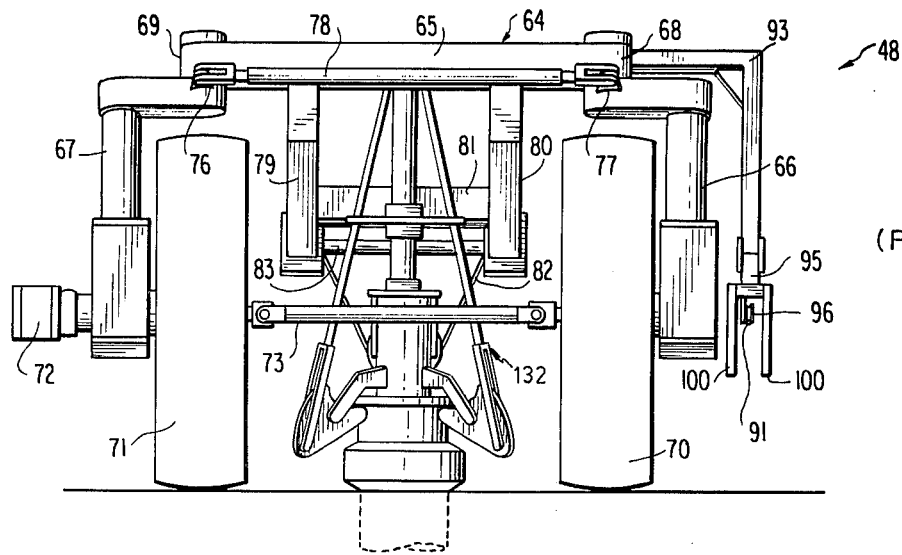
FIG. 5
(PRIOR ART)
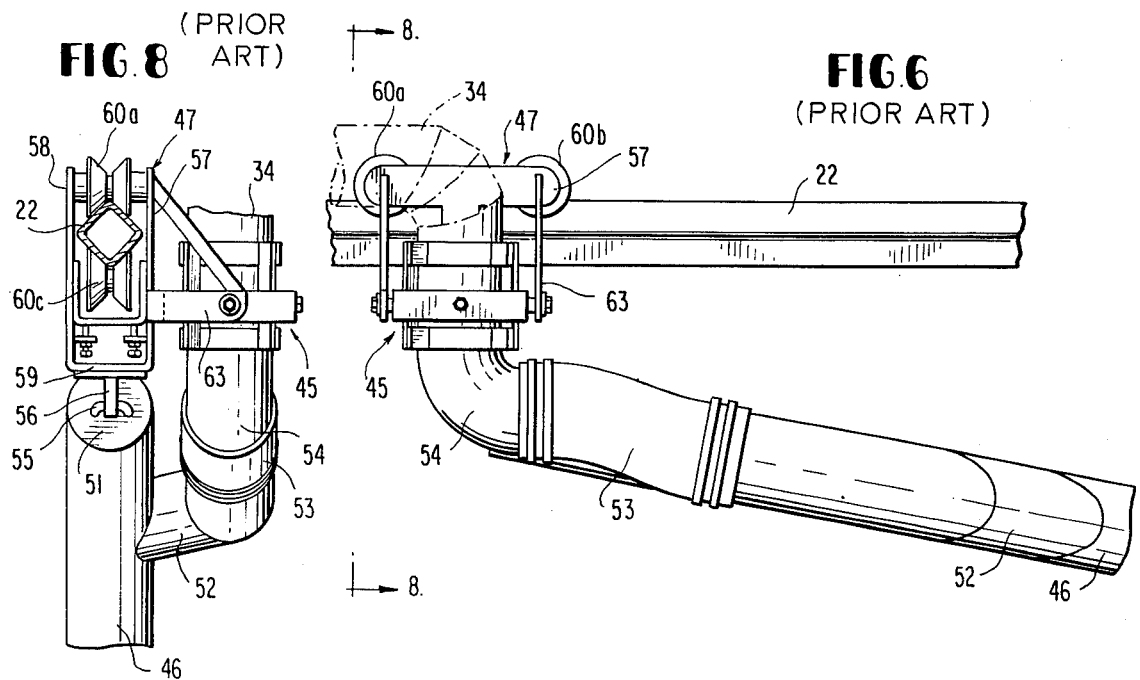
FIG. 8
(PRIOR ART)
FIG. 6
(PRIOR ART)
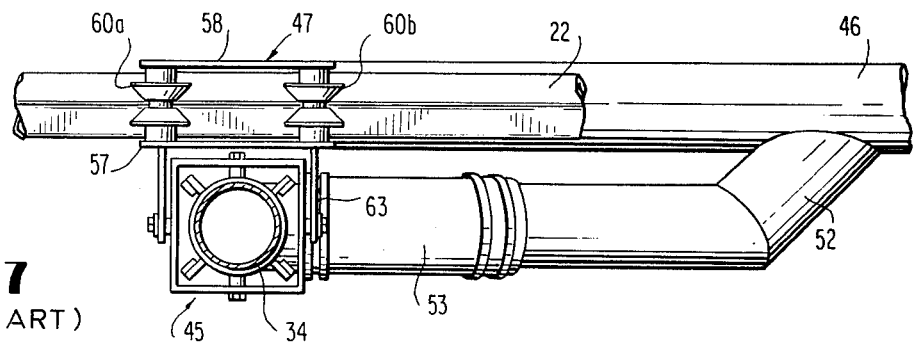
FIG. 7
(PRIOR ART)

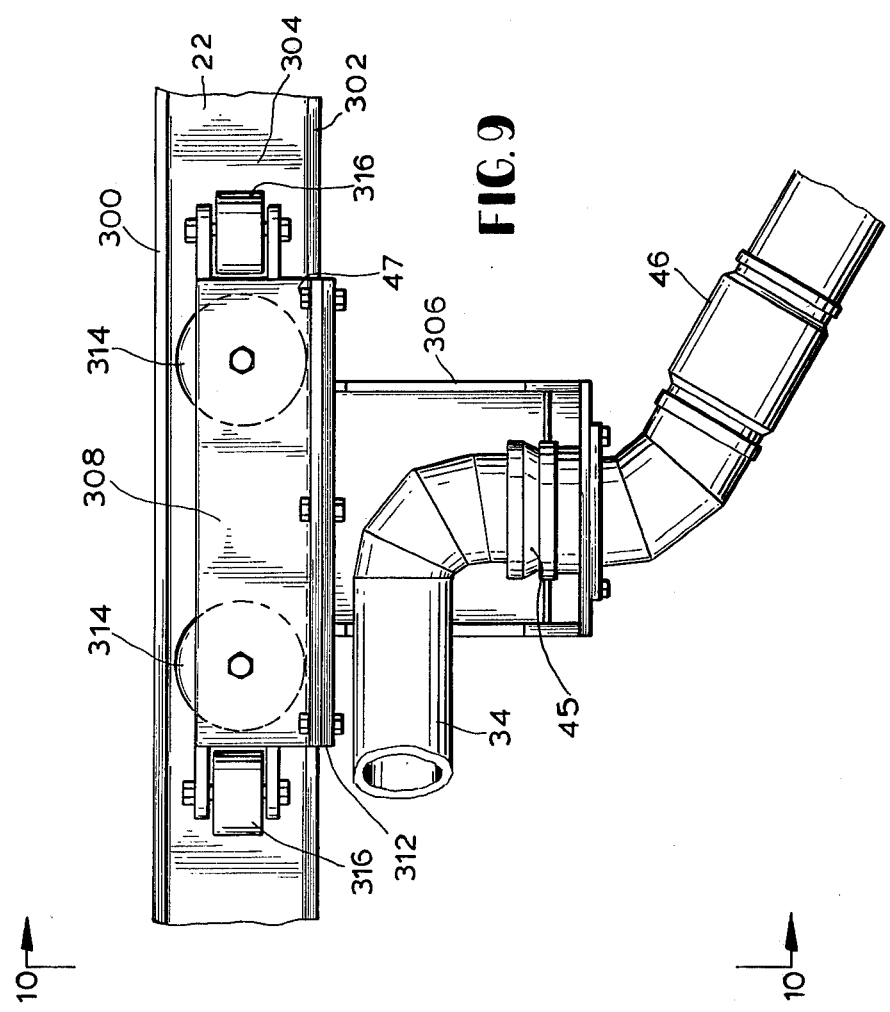
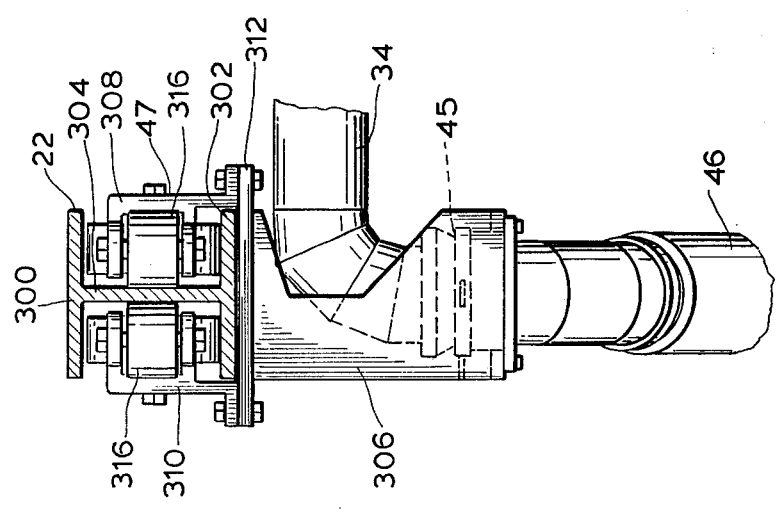

SUPPORT STRUCTURE FOR LAND IRRIGATION SYSTEM

CROSS-REFERENCE TO RELATED APPLICATIONS

This application is a continuation-in-part of copending application Ser. No. 146,122, filed May 2, 1980, now abandoned which is a continuation-in-part of application Ser. No. 80,060, filed Sept. 28, 1979, now U.S. Pat. No. 4,274,584, issued June 23, 1981, which is a continuation-in-part of application Ser. No. 887,792, filed Mar. 17, 1978, now abandoned.

BACKGROUND

This invention is for use in connection with a land irrigation system in which a moving water sprinkler line having a water inlet at one point extends laterally to and moves along the length dimension of a stationary water supply main having a plurality of water outlet valves at spaced points along its length. More particularly, the invention is directed to improved structure for supporting a connector pipe which provides a fluid path between the water supply main and the water sprinkler line.

When irrigating extensive areas of land, long sprinkler lines have been used for some time. Water has been supplied to these lines from buried pipes or mains having spaced risers projecting above the surface of the ground for connection to the sprinkler lines. Initially, each time a sprinkler line had to be moved, manual labor was required for this purpose. This was a laborious and time-consuming operation. Later, the sprinkler lines, which can reach a length of a quarter of a mile and more, were fitted with power-driven wheels to make them easier to move. Eventually, alignment systems were developed to accurately maintain the wheeled sprinkler lines in alignment and to keep them moving slowly along the desired path parallel to the direction of the main line. Flexible hoses or jointed pipes extended between the water inlet end of the sprinkler lines and the respectively connected riser.

Since the main line can be a pipe of eight or more inches in diameter and contain water under substantial pressure, the required size and strength of the flexible hoses and jointed pipe became extremely burdensome in manual operation. Proposals therefore have been made to facilitate connection of the sprinkling lines to successive risers with a minimum of manual effort. However, it is not believed that a commercially successful machine has previously been developed. Examples of such proposals are illustrated in U.S. Pat. No. 2,740,228 to Engel; U.S. Pat. No. Re. 26,285 to Stafford; U.S. Patent Nos. 3,381,893 and 3,446,434 to Smith. Such proposals provided for intermittent connection of the sprinkler line to the main line utilizing power assisted mechanical devices as the hoses or telescoping pipes were moved from riser to riser, with the sprinkler line continuing to move along at the desired rate.

In order to provide for a continuous source of water to the sprinkler line, U.S. Pat. No. 3,463,175 to Rogers; U.S. Pat. No. 4,036,436 to Standal; and Russian Pat. No. 434,918 proposed systems in which one riser is always connected to the sprinkler line, this being accomplished by having pipe or hose connections to the sprinkler line connect with mobile hydrant couplers which span three risers. By the arrangement employed in the Rogers and Standal patents, the forward hydrant coupler is disconnected from a first riser and proceeds to a second riser forward of the first riser. Upon connection of the forward hydrant coupler with the second riser, the trailing hydrant coupler is disconnected from its riser, which is prior in sequence to the first riser in the main line. The trailing hydrant coupler then travels to and is connected with the first riser. Apparently, the requirement for closely spaced risers, their unavailability of reliable water valves in the risers, and inadequate pipe connectors and controls contributed to the failure of these systems to gain commercial acceptance.

In the Russian patent, an elongated horizontal pipe having water valve connectors at each end is pivotally mounted at its center by a downturned ell on the forward end of a second, forwardly projecting elongated horizontal pipe which, in turn, is pivotally mounted at its rear end by an upturned ell to a sprinkler line carried by a mobile carriage. The carriage moves along a water main so that when the valve connector on one end of the first pipe is connected to a hydrant valve, the doubly pivoted mounting permits the other end of the first pipe to swing in an arc around the hydrant to bring the other valve connecting means into position to be connected to a second hydrant valve (apparently manually) before the first is disconnected. The entire water connecting mechanism is, therefore, cantilevered forward of the carriage. It appears that the illustrated system is inoperative which suggests that this device also may have never been actually used.

U.S. Pat. No. 3,729,016 to Von Linsowe discloses another irrigation system for continuously feeding water to a sprinkler line. This system is extremely complicated and requires twin main lines since the twin coupling devices for connecting the sprinkler line to the main line cannot pass each other. This proposal appears not to have been commercially accepted.

SUMMARY

In accordance with the present invention, an economical and durable land irrigation system is provided of the type employing an elongated sprinkler line movable transversely of its length along the length dimension of a water main. The system includes an improved elongated track and support structure for supporting a connector pipe from the track. The track extends generally in the direction of the axis of the water main and is supported for movement with the sprinkler line at a height above the water main. The support structure is movable along the track such that the inner end portion of the connector pipe is supported directly below the track during movement of the support structure therealong.

The elongated track is mounted on the tractor and extends in generally parallel upwardly spaced relation to the water main. A pair of elongated connector pipes each having one end portion connected to the support structure for movement along the track. An articulated pipe assembly connects the inner, track-supported ends of the connector pipes to the sprinkler line.

The connector pipes are cantilevered in opposite directions from the tractor and are generally parallel to the water main and to the track. Each has its outer end portion supported by a carriage or truck having driven ground engaging wheels for moving the connector pipes along the track relative to one another and relative to the tractor. Each connector pipe includes an improved hydrant locator and connector, and valve operator on its outer end portion for engaging and automatically coupling the connector pipe to the hydrants and for activating the valves.

In one aspect of the present invention, the track has an I-shape for maximum strength. The I-shape is formed by upper and lower members equally spaced by a central, vertical support. The support structure rides upon the bottom member of the I. In another aspect of the present invention, the support structure is configured so that it, the track, the connector pipe, and the water main are substantially coplanar. This relieves stresses and twisting moments on the track.

It is therefore a general object of the present invention to provide an automatic hydrant coupling irrigation system having new and improved support structure.

BRIEF DESCRIPTION OF THE DRAWINGS

These and other features and advantages will become apparent from the detailed description taken in connection with the appended drawings, in which like parts are given identical reference numerals and in which:

FIG. 1 is a top plan view of an irrigation apparatus connected between a sprinkler line and a subterranean water main with the water main being shown in broken lines;

FIG. 2 is a side elevation view of the apparatus shown in FIG. 1;

FIG. 5 is a sectional view taken on line 5—5 of FIG. 3;

FIG. 6 is an enlarged fragmentary side elevation view taken along line 6—6 of FIG. 1;

FIG. 7 is a top plan view of the structure of FIG. 6;

FIG. 8 is a sectional view taken on line 8—8 of FIG. 6;

FIG. 9 is a side view of a track, support trolley, and inner end portion of a connector pipe in accordance with the present invention; and FIG. 10 is a sectional view taken along section line 10—10 in FIG. 9.

DETAILED DESCRIPTION

Figure 3:
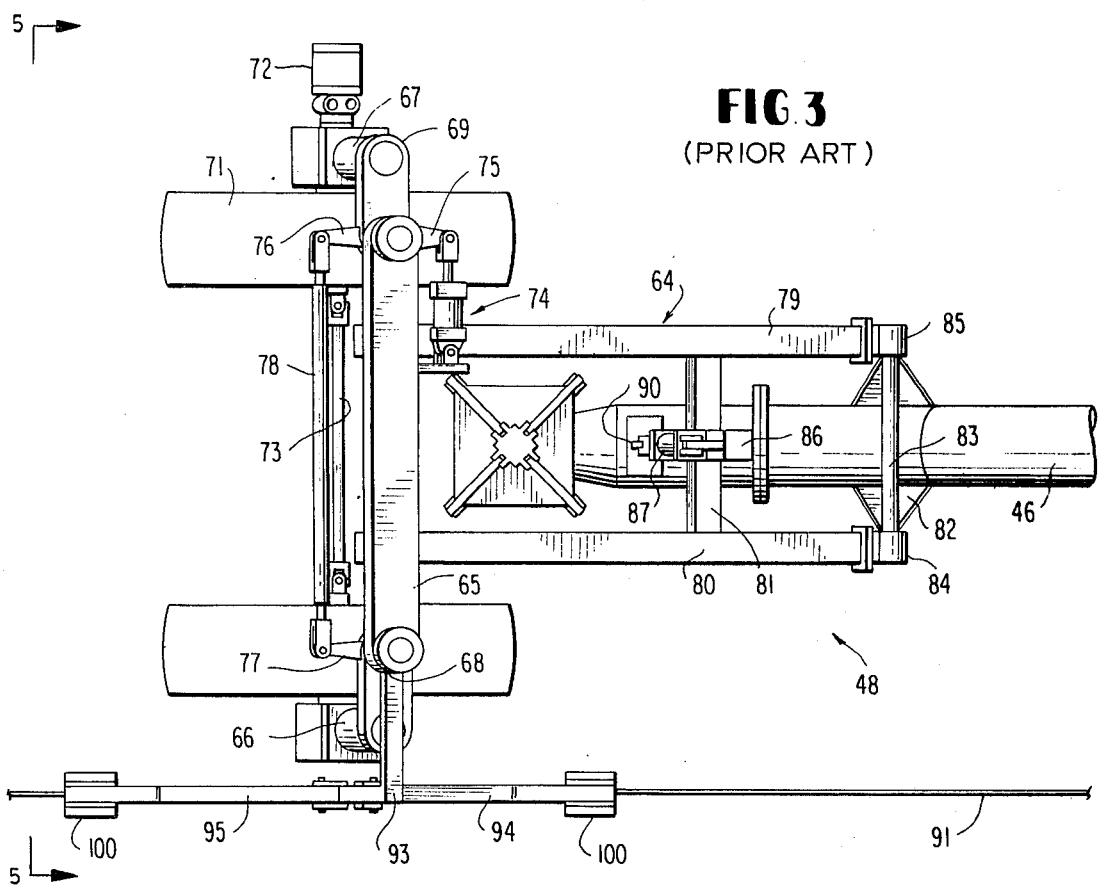
FIG. 3 is an enlarged top plan view of a hydrant coupler of the apparatus shown in FIG. 1.
Figure 4:
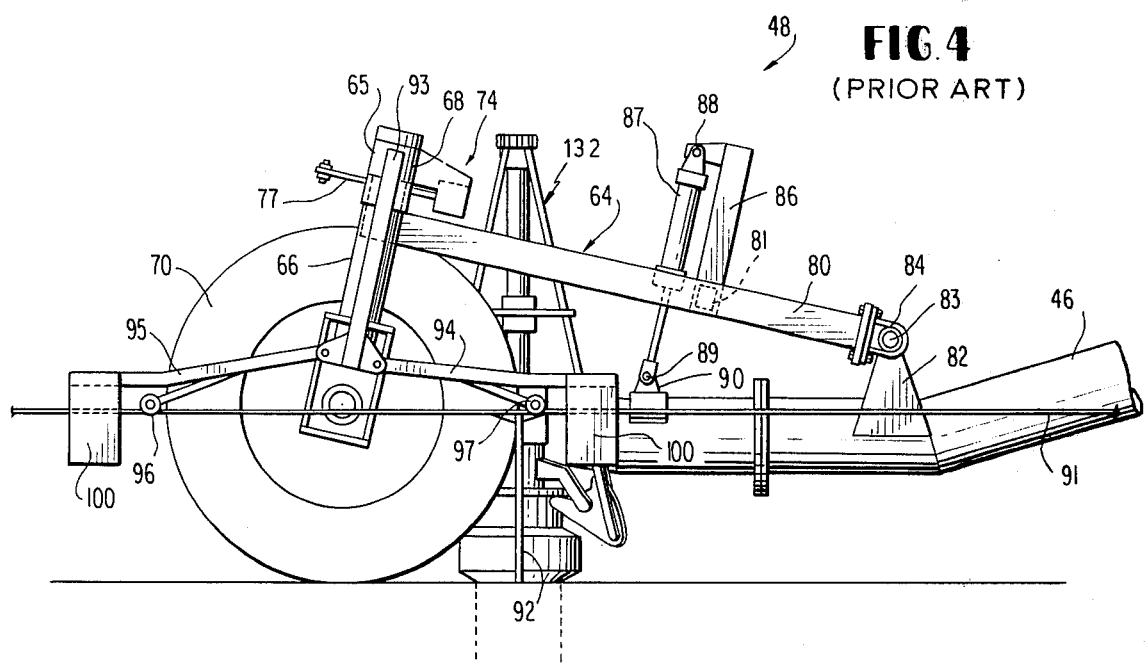
FIG. 4 is a side elevation view of the hydrant coupler shown in FIG. 3.

FIGS. 1-8 illustrate a specific embodiment of a land irrigation system which is disclosed and described in detail in copending application Ser. No. 146,122, filed May 2, 1980, now abandoned. This application is incorporated by reference herein for purposes of explaining the prior art and the system over which the following is an improvement.

Referring first to FIGS. 1 and 2 of the drawings, a prior art linear irrigation system is shown. A pair of water sprinkler lines, designated generally by the reference numeral 10, are shown supported by a truss structure 11 and each having one end mounted at the top of a driven, wheeled conveyance mechanism, or tractor, designated generally by the reference numeral 12. The tractor 12 has an open frame structure including a pair of laterally spaced A-frame assemblies 13, 14 rigidly joined at their top by an elongated water pipe or manifold assembly 15 and at a point spaced below the manifold 15 by a structural platform 16. Wheels 17 located one at each corner of the assembly support the tractor for movement over the ground. Each wheel 17 is preferably driven by a separate motor 18, and the drive motors are synchronized to control movement of the tractor along the length dimension of a fixed subterranean water main indicated by broken lines at 19. Suitable flexible couplings 20, 21 are provided between the sprinkler lines 10 and the manifold 15 to permit limited pivotal or steering movement between the tractor 12 and the sprinkling lines 10. Although two separate sprinkling lines 10 are illustrated, it is understood that only one sprinkling line extending outwardly from one side of the tractor may be used.

As shown in FIGS. 1 and 2, an elongated support rail or track 22 has its central portion rigidly mounted on the horizontal platform 16 at a point substantially midway between the A-frames 13, 14. The track 22 is generally horizontal and extends fore and aft of the tractor 12 in a line substantially parallel to water main 19. The track may be made of any suitable material such as a length of heavy wall pipe, a rolled structural shape, or the like. Suitable cable or other bracing 23 extending between the ends of the track and manifold 15 is provided to carry a portion of the weight of and stabilize the track against undue flexing or bending. In the prior art embodiment illustrated in FIGS. 1 and 2, the track 22 has a rectangular or square cross section and is mounted with two diagonally opposed corners in a vertical plane. This structural configuration has exhibited loading, bending, and twisting problems not optimum for the described operation.

The manifold assembly 15 includes an elongated rigid pipe 24 extending between and rigidly connected to the top of A-frames 13 and 14, with the ends of pipe 24 extending outwardly therefrom for connection to the sprinkler lines 10 by the couplings 20, 21. At a location adjacent one of the A-frames, for example A-frame 14 as shown in FIG. 1, a pair of ells or generally V-shaped pipe members 25, 26 have their open ends welded in openings in the sides of pipe 24, with members 25 and 26 forming rigid pipe loops extending horizontally outward from both sides of the pipe 24. A pair of short pipe sections 27, 28 welded into and project downwardly from the outer portion of V-shaped pipe members 25, 26, respectively, support a pair of swivel couplings 29, 30 respectively on their bottom ends to pivotally support one end of a pair of identical articulated pipe assemblies 31, 32. Since articulated pipe assemblies 31, 32 are identical, like reference numerals will be employed herein and in the drawings to designate corresponding parts of both assemblies.

Articulated pipe assemblies 31, 32 each include a pair of elongated pipes 33, 34 each terminating at one end in an upwardly directed ell and at the other end in a downwardly directed ell. Pipes 33 have their upwardly directed ends pivotally supported by the swivel couplings 29, 30 and their downwardly directed ends pivotally connected by swivel couplings 35 to the upwardly directed ends of the pipes 34. A rigid, open bracket 36 welded on and projecting above the V-shaped pipe members 25, 26 supports a pair of posts 37, 38 for limited pivotal movement about the vertical axis of the swivel couplings 29, 30, respectively.

Elongated, rigid arms 39, 40, respectively, are welded onto and project laterally from the lower ends of posts 37, 38, respectively, and guy wires 41, 42, respectively, connect the top portion of the posts and the outwardly projecting ends of the arms 39, 40. Wires 41, 42 extend downward from the ends of the arms 39, 40 and are connected to the pipes 33 at points near their downturned ends to provide vertical support for the central portion of the articulated pipe assemblies 31, 32. The downturned ends of the pipes 34 are pivotally supported on and connected to each of a pair of identical connector pipe assemblies 43, 44 by swivel couplings 45.

As shown in FIGS. 6-8, a connector pipe assembly 43 (FIG. 2) includes an elongated water conduit or pipe 46 having one end supported for free rolling movement along track 22 by a roller carriage or trolley 47 and its other downwardly directed open end portion supported by a wheeled carriage assembly 48 for movement into position to be connected to spaced risers or hydrants 49 connected to and projecting upwardly from the water main 19. Outlet valves 50 mounted respectively in the top of each hydrant are operable to supply water from the main to a connector pipe assembly connected to the hydrant.

The inner end portion of the elongated water pipe 46, i.e., the end supported by trolley 47 on track 22, is closed by a cap 51. A 45° ell 52 is rigidly welded on and communicates with the pipe 46 at a point spaced from its end. A short length of flexible hose 53 has one end connected to the open end of the ell 52, and its other end is connected to a 90° ell 54. The ell 54 is connected to and extends downward from swivel coupling 45 to complete a fluid path from the water pipe 46 through the articulated pipe assembly 31 and the manifold 15 to the sprinkler line 10. A rigid metal ring or loop 55 welded on cap 51 cooperates with a link 56 to support the end of the pipe 46 on trolley 47.

The trolleys 47 each include a frame including a pair of laterally spaced side plates 57, 58 joined at their bottom ends by an integrally formed horizontal base member 59 which supports the link 56. A pair of rollers 60a and 60b are mounted between plates 57, 58 adjacent their tops and support the trolley 47 for rolling movement on track 22. The rollers 60a and 60b have concave load bearing surfaces defined by a V-shaped groove extending around their periphery to closely conform to and roll on the upwardly directed flat surface of the track 22. A single concave, V-shaped roller 60c is mounted between plates 57, 58 below track 22 and cooperates with the rollers 60a and 60b in an attempt to maintain trolley 47 against twisting movement on track 22 while permitting free rolling movement therealong. A gimbal support assembly 62 has its outer ring pivotally supported on a bracket 63 mounted on and projecting laterally from side plate 57, and its inner ring connected to the swivel coupling 45 to permit relative movement between the articulated pipe assemblies and the connector pipe assemblies within limits permitted by the hose section 53.

In the prior art embodiment illustrated in FIGS. 6-8, pipe 46 and swivel coupling 45 are supported from track 22 at a position offset from the longitudinal axis of track 22.

In accordance with the present invention, the inner end portion of pipe 46 and the swivel coupling 45 are supported from track 22 at a position substantially directly underlying the longitudinal axis of track 22. As illustrated in FIGS. 9 and 10, track 22 has a generally I-shaped cross-section, having a substantially flat top member 300 vertically spaced above a substantially flat bottom member 302. A substantially flat central, vertical support member 304 separates the top member 300 substantially equidistantly from the bottom member 302. Preferably, the vertical member 304 is substantially perpendicular to the members 300 and 302. In the preferred and illustrated embodiment, the members 300, 302 and 304 are unitary; i.e., formed as a single casting.

As shown, the swivel coupling 45 is supported by known techniques from the track 22 within a housing 306. The housing 306 is in turn affixed to and supported from the trolley 47 directly below the track 22. The trolley 47 includes a pair of laterally spaced side members 308 and 310, which are joined at their lower ends by a horizontal base member 312. The housing 306 is supported from the base member 312 and is configured to allow limited movement of the inner end portion of the pipe 46 and the pipe 34 relative to the swivel coupling 45.

Each of the side members 308, 310 includes a first bearing surface 314 for riding on the bottom member 302 as the trolley 47 travels along the track 22. Second bearing surfaces 316 are provided on each of the respective side members for riding along the vertical support member 304. As shown, the first bearing surface 314 includes a pair of rollers which are freely rotatable on each side member, as is known to those skilled in the art. Likewise, second bearing surface 316 includes a pair of rollers which are freely rotatable on each side member and which are positioned at a 90° angle to the rollers of the first bearing surface.

The swivel coupling 45 receives the inner end portion of connector pipe 46 for connection to the articulated pipe assembly 31, as disclosed in U.S. patent application Ser. No. 146,122. However, as an important improvement over U.S. patent application Ser. No. 146,122, as the trolley 47 travels along the track 22, the swivel coupling 45 and the inner end portion of the pipe 46 are supported beneath the track 22, such that there are no twisting moments imparted to the trolley 47, the track 22, the coupling 45, or to any of the other cooperating structural members. In the presently preferred embodiment, the track 22, the connector pipe 46, and the water main 19 are configured and arranged to be generally coplanar.

It is to be understood that the members 300, 302, and 304 may admit of other precise embodiments in the general I-shaped configuration, and still remain within the contemplation of the present invention.

Referring again to FIGS. 1 and 2, it is seen that the overall length of the irrigation apparatus including the track 22 and the two connector pipe assemblies 43, 44, is sufficient to span three hydrants 49 along the water main 19 when the connector assemblies are extended to a point adjacent the end of the track 22. In this position, the connector pipe assembly 43 may be connected to a first hydrant, the tractor 12 positioned directly above the next hydrant 49 along the water main 19 and the connector pipe assembly 44 connected to the third successive hydrant 49. When the connector pipe assembly 43 is disconnected from the first hydrant, the tractor can proceed to a position approximately half the distance between the second and third hydrants at which point the trolley 47 supporting the water pipe 46 of connector pipe assembly 44 will have rolled along track 22 to a position adjacent the central platform 16. During this time, the connector pipe assembly 43 can be driven forward at a rate greater than the rate of movement of the tractor, with its trolley 47 rolling freely along track 22 independent of movement of the tractor, to position the connector pipe assembly 43 for connection to the second hydrant 49. After the connector pipe assembly is connected to the second hydrant, the connector pipe assembly 44 can be disconnected from the third hydrant 49 and advanced with the tractor 12 along the length dimension of the water main 19 into position for connection to the fourth, or next successive hydrant. This procedure can be repeated to progressively walk the apparatus through a field, in either direction, with the tractor being driven at a substantially constant rate corresponding to the rate of movement of the sprinkler line.

As the tractor 12 moves down the field, its respective wheels 17 will at times encounter different ground levels which will cause track 22 to depart from its normal position parallel to the water main 19. However, since the trolleys 47 support the inner end portions of pipes 46 directly underneath I-shaped track 22, twisting moments between the track 22 and the pipes 46 are substantially reduced, and limited departure of track 22 from its normal position does not adversely affect operation of the apparatus.

Since the trolleys 47 are provided with bearing surfaces 314 and 316 to roll freely on track 22 very little force is required to maintain a connector assembly stationary as the tractor moves along the water main 19 with the sprinkler line. Thus, once a coupling mechanism 132 is connected to a hydrant 49 this connection will maintain the associated connector pipe assembly stationary until the coupling mechanism is disconnected in sequence. At that time, suitable controls carried by tractor 12 energize drive motor 72 in a direction to drive carriage 48 and the associated connector pipe assembly forward along the water main. They are driven at a rate which is at least substantially twice the rate of the tractor to move the associated trolley 47 along the track 22 to position the associated coupling mechanism 132 adjacent the next successive hydrant 49 while the tractor moves along the water main 19 about one half the distance between successive hydrants.

Thus, referring to FIG. 2, with the tractor 12 positioned at one hydrant 49 (and moving left to right), when the pipe connector assembly 43 is connected to the next hydrant forward of the tractor, and the connector assembly 44 having just been disconnected from the next hydrant behind the tractor, the carriage assembly 48 of assembly 44 is driven at a rate to position its coupling mechanism 132 over the next succeeding hydrant by the time the tractor has reached a range approximately halfway to the next succeeding hydrant. Within this range, the trolley 47 of the connector assembly 44 will be positioned substantially adjacent the horizontal platform 16 so that the tractor can continue its movement to the next succeeding hydrant without further movement of the connector assembly 44. During this continued movement of the tractor, the connector assembly 43 is disconnected from its hydrant and driven forward to position its associated coupling mechanism 132 above the next succeeding hydrant, at the same time rolling its trolley 47 along the track 22 from the position adjacent the central platform 16 to a position adjacent the end of the track.

It is to be understood that the invention will admit of other embodiments. The detailed description is given only to facilitate understanding of the invention by those skilled in the art and should not be construed as limiting the invention.

What is claimed is:

1. In a land irrigation system including a water main having a plurality of water hydrants projecting upwardly from the water main at spaced points along its length, an elongated sprinkler line extending transversely to the length dimension of the water main, tractor means movable along said water main and coupled to said sprinkler line, means responsive to said tractor means for moving the sprinkler line along the water main, an elongated conduit having an elongated inner end portion and an outer end portion, providing means for providing the inner end portion to be in fluid communication with the sprinkler line, a swivel coupling connecting the providing means and the inner end portion of said elongated conduit, wheeled carriage means for providing the outer end portion to be in fluid communication with a water hydrant for supplying water to the sprinkler line, and drive means for moving the carriage means from hydrant to hydrant, the improved providing means comprising:
   an elongated track extending generally in the direction of the axis of the water main;
   means for supporting the elongated track for movement with the sprinkler line at a height above the water hydrants; and
   support means moveably suspended from the track and connected to said elongated conduit at said swivel coupling for supporting said inner end portion and said swivel coupling for movement directly beneath the track during all movement of the support means along the track, thereby minimizing twisting moments on the track.

2. The system of claim 1, wherein the support means, the elongated track, the conduit, and the water main are substantially coplanar.

3. The system of claims 1 or 2, wherein the elongated track comprises a substantially flat top member vertically spaced from a substantially flat bottom member by a vertical support member, thereby to form an I-shaped structure.

4. The system according to claim 3 wherein the top, bottom, and vertical members are unitary.

5. The system of claim 3, wherein the support means includes a first bearing surface for riding on the bottom member of the track.

6. The system of claim 5, wherein the support means further includes a second bearing surface for riding on the vertical support member of the track.

7. In a land irrigation system including a water main having a plurality of water hydrants projecting upwardly from the water main at spaced points along its length, an elongated sprinkler line extending transversely to the length dimension of the water main, tractor means moveable along said water main and coupled to said sprinkler line, means responsive to said tractor means for moving the sprinkler line along the water main, an elongated conduit having an elongated inner end portion and an outer end portion, providing means for providing the inner end portion to be in fluid communication with the sprinkler line, a swivel coupling connecting the providing means and the inner end portion of said elongated conduit, wheeled carriage means for providing the outer end portion to be in fluid communication with a water hydrant for supplying water to the sprinkler line, and drive means for moving the carriage means from hydrant to hydrant, the improved providing means comprising:
   (a) an elongated track cantilevered from said tractor means in the direction of the axis of the water main and supported for movement with the sprinkler line at a height above the water hydrants, the elongated track configured in an I-shaped structure having a substantially flat top member equidistantly spaced from a substantially flat bottom member; and (b) support means moveably suspended from the track and connected to said elongated conduit at said swivel coupling for supporting said inner end portion and said swivel coupling directly beneath the track during all movement of the support means therealong, said support means including a bearing surface for riding on said bottom member;

wherein said elongated track, said conduit, said support means, said swivel coupling and said water main are substantially co-planar for minimizing twisting moments on the track.

* * * * *